Jan. 30, 1962  F. LORE  3,018,992
QUICK LEVEL TRIPOD TABLE CONTROL SYSTEM
Filed Dec. 10, 1959
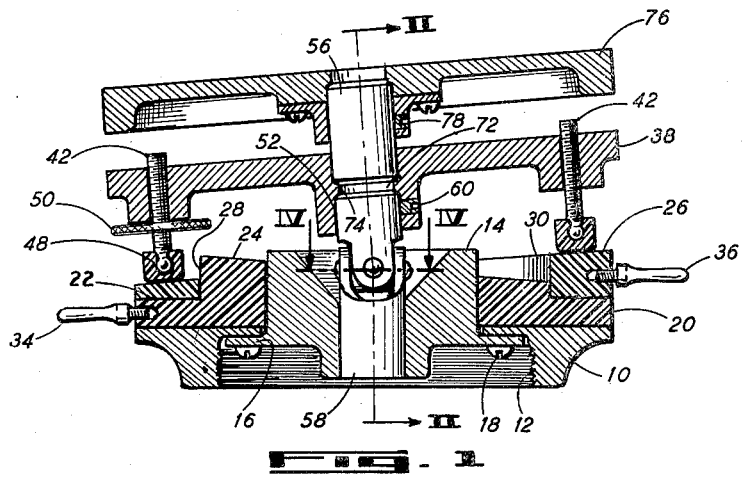
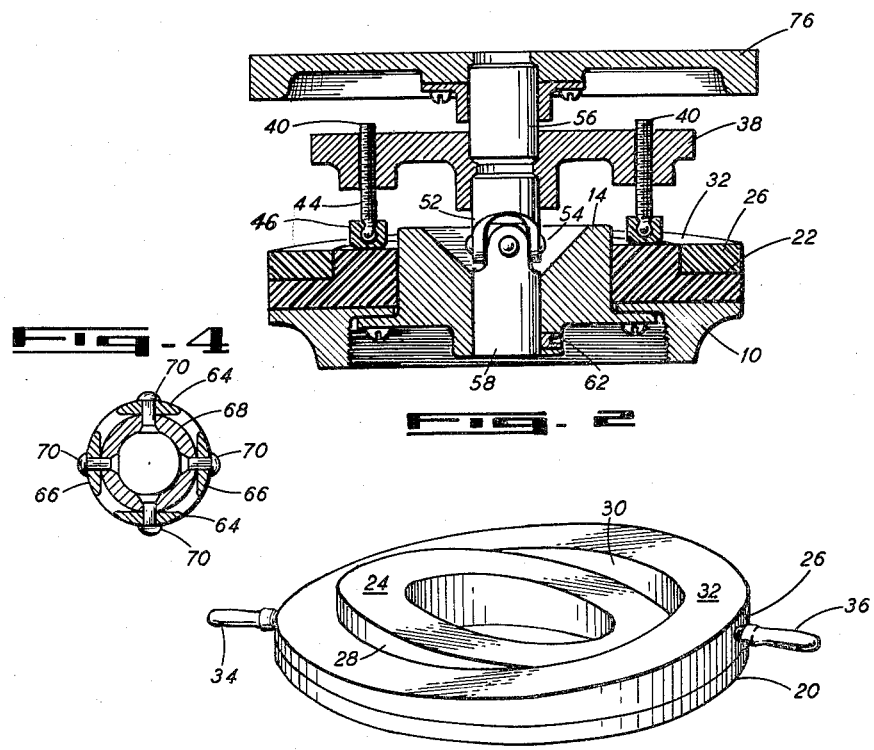
INVENTOR:
Frank Lore
BY Naylor & Neal
ATTORNEYS

United States Patent Office 3,018,992
Patented Jan. 30, 1962

3,018,992
QUICK LEVEL TRIPOD TABLE CONTROL SYSTEM
Frank Lore, 822 Clayton St., San Francisco, Calif., assignor of one-half to Albert Lipp, San Francisco, Calif.
Filed Dec. 10, 1959, Ser. No. 858,786
9 Claims. (Cl. 248—180)

This invention relates to adjusting means for universally adjusting the inclination of two bodies with respect to each other, and more particularly, to means by which a table can be leveled quickly and accurately when the base upon which the table rests is not level.

In the mounting of many units of equipment it is desirable and often essential that the equipment be level for proper operation. This is particularly true in the mounting of accurate instruments such as surveyor's transits and the like which must be used on uneven ground but which must be accurately level for proper use.

While several types of adjusting means have been employed for leveling such apparatus, they have all involved inherent disadvantages in use, namely: Many of them are incapable of leveling the equipment sufficiently accurately; many of them are incapable of leveling the equipment sufficiently rapidly, and many of them are unable to maintain the equipment in a level condition when the equipment is in use.

The most efficient types of adjusting means used for this purpose heretofore provide means for adjusting the inclination of one body with respect to the other in two planes which are inclined to each other. This type of adjusting means permits of the most rapid leveling of the pieces of equipment since a leveling glass may be employed in conjunction with the leveling means to first level the equipment in one plane and secondly level the equipment in the second plane without disturbing its level condition in the first plane. The equipment when leveled in two planes inclined to each other will then be level in all planes. Several of these most efficient types of leveling means have, however, employed leveling devices in the two planes which cannot be operated independently of each other, it being necessary that a particular one of the two be operated before the other one. This latter type of leveling means does not achieve the full benefit of the advantages obtained by leveling the equipment in two planes which are inclined with respect to each other since, when the equipment becomes out of level in the plane which must be adjusted first, the equipment must be releveled in both planes rather than merely in the one plane which is out of level.

Accordingly, it is a principal object of this invention to provide adjusting means whereby the relative inclination of two bodies with respect to each other may be adjusted rapidly and accurately.

It is another object of this invention to provide such an adjusting means which is capable of maintaining the bodies in the desired relative inclination even when the bodies are subjected to substantial vibration or substantial other forces incident to the normal operation of the bodies.

It is a further object of this invention to provide adjusting means whereby the inclinations of the two bodies with respect to each other can be adjusted in two planes inclined with respect to each other.

It is a further object of this invention to provide such adjusting means whereby the adjustments made in the two inclined planes can each be made independently without upsetting the adjustment in the other plane.

It is a further object of this invention to provide such adjusting means which is particularly useful for leveling surveyors' instruments mounted on a tripod.

Other objects and advantages of the present invention will become apparent from the following description read in conjunction with the attached drawings, in which:

FIGURE 1 is a vertical cross-sectional view of apparatus employing one form of the adjusting means of this invention;

FIGURE 2 is a vertical cross-sectional view taken along the plane and in the direction indicated by the line and the arrows at II—II in FIGURE 1;

FIGURE 3 is a top perspective view of the adjusting means employed in the apparatus in FIGURES 1 and 2; and FIGURE 4 is a cross-sectional view of the apparatus of FIGURE 1 taken along the plane and in the direction indicated by the line and the arrows at IV—IV in FIGURE 1.

Broadly stated, this invention comprises adjusting means for universally adjusting the relative inclinations of first and second bodies with respect to each other which comprises a first adjusting member mounted on said first body for rotation about a first central axis and having a first cam surface thereon having parallel arcuate portions on opposite sides of said axis and inclined with respect to said axis, two cams mounted on said second body and positioned to contact said arcuate portions of said first cam surface at a first pair of points on opposite sides of said axis, a second adjusting member mounted on one of said bodies for rotation about a second central axis having a common point with said first axis, said second member having at least a second cam surface theron having parallel arcuate portions on opposite sides of said second axis and inclined with respect to said second axis, two cams mounted on the body other than the one on which said second member is mounted and positioned to contact said arcuate portions of said second cam surface at a second pair of points on opposite sides of said second axis, the plane including said first axis and said first pair of points being inclined to the plane including said second axis and said second pair of points.

Referring now in detail to the drawings, a base member 10 is provided with a central aperture 12 in the bottom thereof which is threaded to receive the usual male threaded member on the top of a tripod. A central body portion 14 having a flange 16 around the lower edge thereof is mounted in base member 10 by means of screws 18. The outer surface of body member 14 is cylindrical about a vertical axis and is embraced by the inner cylindrical surface of a lower adjusting ring member 20 the lower surface of which is planar and perpendicular to the axis of body 14. The lower surface of adjusting ring 20 rests on the upper surface of base member 10.

The upper surface of ring member 20 is provided with two radially spaced annular surfaces 22 and 24. Surface 22 is planar and perpendicular to the axis of body 14 and provides an annular bearing surface on which an upper bearing ring 26 rests. Surface 24 is planar and inclined to the axis of body member 14 and comprises a first cam surface the function of which is described hereinafter. Annular surfaces 22 and 24 are bounded on their inside and outside edges respectively by a cylindrical surface 28 coaxial with the axis of body 14. Upper adjusting ring member 26 is provided with an inner cylindrical surface 30 which embraces surface 28 to permit ring member 26 to rotate coaxially with the axis of body 14. The upper surface 32 of ring adjusting member 26 is a planar, annular second cam surface inclined with respect to the axis of body 14.

Ring adjusting members 20 and 26 are provided with generally radially extending handles 34 and 36 respectively which permit ring members 20 and 26 to be rotated relative to each other and relative to body member 14.

It should be noted that it is most desirable to construct ring members 20 and 26 of a material having a relatively high coefficient of static friction and with relatively close tolerances between surfaces 28 and 30 and the inner surface of ring 20 and the outer surface of body 14 in order that ring members 20 and 26 will have a substantial tendency to remain rotationally fixed with respect to each other once they are moved to a given rotational position by handles 34 and 36. I have found it desirable to construct rings 20 and 26 out of nylon. Rings 20 and 26 may also be provided with set screws to hold them in position after they have been adjusted.

A table 38 is supported on adjusting members 20 and 26 by means of two sets of cams 40 and 42, respectively. Table 38 and anything supported thereby forms a second body which is adjusted with respect to the body 14 by the ring members 20 and 26. Each of the cams 40 and 42 comprises an elongated threaded shank 44 carrying a lower member 46 on the lower end thereof having a cammed surface on its bottom and being supported on shanks 44 by means of mounting balls 48. A lock nut 50 is provided on each of the shanks 48 for locking cams 40 and 42 to table 38.

Body 14 and table 38 are connected by a centrally extending shaft 52 provided with a universal joint 54 which is illustrated in detail in FIGURE 4. Shaft 52 comprises upper and lower portions 56 and 58, respectively, which are secured to table 38 and body 14 by means of set screws 60 and 62, respectively. Shaft 52 may be provided with suitable indentations therein for the receipt of set screws 60 and 62. The lower end of shaft 56 is provided with a pair of ears 64 thereon, and the upper end of shaft portion 58 is provided with a pair of ears 66 thereon. A universal joint compensating ring 68 is provided between shaft portions 56 and 58 and is secured to ears 64 and 66 by means of rivets 70. Rivets 70 all extend radially of compensating ring 68, the axes of rivets 70 intersecting at the center of ring 68. Upper shaft portion 56 is provided with a circular groove 72 therein which receives a circular annulus 74 on the inside of table 38. Shaft portion 58 and body 14 may be provided with a similar groove and annulus.

As stated above, cam surfaces 24 and 32 on rings 20 and 26, respectively, are concentric with the axis of body 14. The inclination of surfaces 24 and 32 are also such that the planes of the surfaces 24 and 32 intersect the axis of body 14 at the same point. Groove 72 and annulus 74 are so placed as to support shaft portion 58 with the center of universal joint 54 coinciding with the coincident intersections of surfaces 24 and 32 with the axis of body 14, thus permitting proper operation of universal joint 54 without applying undue stresses to the apparatus.

It is apparent that any device placed on the top surface of table 38 may be rendered level regardless of the inclination of base 10 and body 14 by rotating adjusting members 20 and 26 about the axis of body 14. As illustrated in FIGURE 1, where the top surface of table 38 is inclined downwardly and to the left, table 38 can be rendered level by rotating member 26 by pulling handle 36 upwardly out of the page so that the lefthand cam 42 will be lifted upwardly and the righthand cam 42 will be moved downwardly about universal joint 54. In a similar manner the relative inclinations of table 38 and base 10 can be adjusted in the plane of FIGURE 2 by rotating disc 20 about the axis of body 14 to cause cams 40 to raise and lower.

It will be noted that cams 42 are positioned a greater distance from the axis of table 38 than are cams 40 and that similarly surface 32 is positioned at a greater distance from the axis of body 14 than surface 24. This provision of different radial distances between the associated members permits the rotation of rings 20 and 26 independently of each other and through an angle of 360°. In order to facilitate the use of this device with surveyors' tools an upper rotatable table 76 is mounted on upper shaft portion 56 parallel to the top surface of table 38. A set screw 78 may selectively clamp table 76 to shaft 56 or be loosened to permit table 76 to rotate about shaft 56 when it is desirable to rotate a transit mounted on table 76.

The adjusting means described above are capable of adjusting the inclination of two bodies very rapidly and accurately, two simple rotations of rings 20 and 26 being sufficient to universally adjust the relative inclination of the two bodies. The provision of cam surfaces 24 and 32 extending throughout 360° around the axis of body 14 permits the maximum accuracy of adjustment coupled with maximum range of adjustment. Sufficient accuracy of adjustment is obtainable by rotation of rings 20 and 26 that it is unnecessary to adjust cams 40 and 42 when leveling table 38. Cams 40 and 42 are provided for making initial adjustments when the device is manufactured and for making large adjustments when leveling of table 38 requires adjustments exceeding the magnitude of adjustments which can be made with rings 20 and 26. The two rings can adjust the relative inclination of the two bodies in two planes independently without disturbing the inclination in the other plane.

What is claimed is:

1. Adjusting means for universally adjusting the relative inclinations of first and second bodies with respect to each other which comprises a first adjusting member mounted on said first body for rotation about a first central axis and having a first cam surface thereon having parallel arcuate portions on opposite sides of said axis and inclined with respect to said axis, two cams mounted on said second body and positioned to contact said arcuate portions of said first cam surface at a first pair of points on opposite sides of said axis, a second adjusting member mounted on one of said bodies for rotation about a second central axis having at least a common point with said first axis, said second member having a second cam surface thereon radially spaced from said first cam surface and having parallel arcuate portions on opposite sides of said second axis and inclined with respect to said second axis, two cams mounted on the body other than the one on which said second member is mounted and positioned to contact said arcuate portions of said second cam surface at a second pair of points on opposite sides of said second axis, the plane including said first axis and said first pair of points being inclined to the plane including said second axis and said second pair of points.

2. The adjusting means of claim 1 in which each of said arcuate portions extends through 180° around the axis around which it rotates.

3. The adjusting means of claim 2 in which the arcuate portions of said first cam surface are coplanar and form a continuous annular surface, and the arcuate portions of said second cam surface are coplanar and form a continuous annular surface.

4. The adjusting means of claim 1 in which said first and second bodies are connected by a shaft extending therebetween and provided with a universal joint therein the center of which lies at said common point of said first and second axis.

5. The adjusting means of claim 1 in which both of said adjusting members are mounted on said first body and said first and second axes are colinear.

6. In apparatus having a base member and a table member mounted on said base member, the improvement comprising adjusting means for rendering said table level when said base is inclined at different angles to a horizontal plane which comprises, a first adjusting ring mounted on said base for rotation thereon about a generally vertical axis, the upper surface of said first ring having inner and outer radially spaced annular plane surfaces one of which is a bearing surface perpendicular to said axis and the other of which is a first cam surface inclined with respect to said axis, a pair of cams mounted on said table and positioned to contact said first cam surface at a first pair of points on opposite sides of said axis, a second adjusting ring mounted on said bearing surface for rotation about said axis and having on the top thereof a second annular cam surface inclined with respect to said axis, and a pair of cams mounted on said table and positioned to contact said second cam surface at a second pair of points on opposite sides of said axis, the axial plane of said first pair of points being inclined to the axial plane of said second pair of points.

7. The apparatus of claim 6 in which said base and said table are connected by a shaft extending therebetween and provided with a universal joint therein, the center of which lies on said axis.

8. The apparatus of claim 6 in which said bearing surface is spaced radially outwardly of said first cam surface.

9. Adjusting means for universally adjusting the relative inclinations of first and second bodies with respect to each other comprising a first adjusting ring mounted on said first body for rotation about a first central axis, said ring having a first cam surface inclined with respect to said axis, two cams mounted on said second body and positioned to contact said first cam surface at a first pair of points on opposite sides of said axis, a second adjusting ring mounted on one of said bodies for rotation about a second central axis having at least a common point with said first axis, said second ring having a second cam surface inclined wtih respect to said second axis, two cams mounted on the body other than the one on which said second ring is mounted and positioned to contact said second cam surface at a second pair of points on opposite sides of said second axis, the plane including said first axis and said first pair of points being inclined to the plane including said second axis and said second pair of points, said first and second rings being positionally related to each other so that rotative movement of any one of them relative to the other imparts no tipping movement to the latter.

References Cited in the file of this patent
UNITED STATES PATENTS

| | | |
|---|---|---|
| 1,182,881 | Frye | May 9, 1916 |
| 2,440,211 | Rothweiler | Apr. 20, 1948 |
| 2,643,844 | Nette | June 30, 1953 |
| 2,726,834 | Hoge | Dec. 13, 1955 |

FOREIGN PATENTS

| | | |
|---|---|---|
| 2,595 | Great Britain | 1910 |
| 13,876 | Great Britain | 1910 |